United States Patent [19]

Frenkiel et al.

[11] Patent Number: 5,044,010

[45] Date of Patent: Aug. 27, 1991

[54] ARRANGEMENT AND METHOD FOR SELECTING AN AVAILABLE COMMUNICATION CHANNEL FOR A CORDLESS TELEPHONE

[75] Inventors: Richard Frenkiel, Englishtown; William J. Nealon, Ocean Grove; Paul Newland, Middletown, all of N.J.

[73] Assignee: AT&T Bell Laboratories, Murray Hill, N.J.

[21] Appl. No.: 500,834

[22] Filed: Mar. 29, 1990

[51] Int. Cl.⁵ .................. H04M 11/00; H01Q 7/02
[52] U.S. Cl. ................................. 379/61; 379/63; 455/34
[58] Field of Search .................... 379/61-63, 379/59, 221; 455/32, 34, 54, 56

[56] References Cited

U.S. PATENT DOCUMENTS

| | | | |
|---|---|---|---|
| 4,598,104 | 6/1986 | Ohki et al. | 455/32 |
| 4,747,101 | 5/1988 | Akaiwa et al. | 455/34 |
| 4,768,219 | 8/1988 | Yamagata | 379/61 |
| 4,768,220 | 8/1988 | Yoshihara et al. | 379/61 |
| 4,894,856 | 1/1990 | Nakanishi et al. | 379/61 |

FOREIGN PATENT DOCUMENTS

| | | | |
|---|---|---|---|
| 0052933 | 3/1984 | Japan | 455/34 |
| 0089827 | 4/1989 | Japan | 455/34 |
| 0170135 | 7/1989 | Japan | 455/34 |

Primary Examiner—Jin F. Ng
Assistant Examiner—Dwayne Bost
Attorney, Agent, or Firm—Samuel R. Williamson

[57] ABSTRACT

A channel scanning arrangement for automatically selecting an available one from multiple communication channels with a minimum probability of interference and without delay is provided for a cordless telephone. This arrangement avoids causing and receiving interference on a channel by scanning all available channels when the cordless telephone is not in use and prioritizing these channels in the order of most recent observed activity. When a user of a handset unit associated with the cordless telephone desires to communicate with a base unit, also associated with the telephone, the handset and base units communicate briefly on the last used channel. When communication between the handset unit and the base unit has been established, the base unit moves and also causes the handset unit to move to the channel that has been unused by an other cordless telephone for the longest period of time.

15 Claims, 4 Drawing Sheets

ARRANGEMENT AND METHOD FOR SELECTING AN AVAILABLE COMMUNICATION CHANNEL FOR A CORDLESS TELEPHONE

BACKGROUND OF THE INVENTION

1. Technical Field

This invention relates to cordless telephones and more particularly to frequency selecting arrangements for selecting an available channel for communications between a handset unit and a base unit of a cordless telephone.

2. Description of the Prior Art

Cordless telephones have been allocated a limited number of communications channels over which they may operate. In the United States, for example, there are only ten allocated channels. And as cordless telephones increase in popularity so does the likelihood of interference between these telephones which must all communicate on these few channels. Although the ten cordless telephone communication channels are available, most cordless telephones in use today operate over only one, two or three of these channels. These telephones operate over a selected channel until the user takes some action to change this channel.

The user achieves a channel change for his or her cordless telephone either by selecting, at the handset unit or base unit as appropriate, a different one from this limited set of channels for operation or, in the case of a one-channel cordless telephone, by returning the telephone to the supplier and obtaining a cordless telephone that operates on a different channel. When the user of such a cordless telephone begins the process of placing a telephone call, there is no way for the user to determine beforehand if the channel on which the cordless telephone will operate is then in use by, for example, another cordless telephone in the vicinity. Thus when the user obtains dial tone from the base unit it may or may not be subjected to interference from another user of a cordless telephone or even some other form of radiation on this channel. And the probability of interference is proportional to the number of other cordless telephones within the reception range of the user's cordless telephone and the length of time each of these telephones is in use over a given period of time.

Recently, some cordless telephones are now being built that are capable of selecting a channel on which to operate from any of the allocated channels. Although this increases the likelihood of the user finding an interference-free channel, he or she may still have to change channels a number of times before finding this channel, all the while causing interference to other users with his or her cordless telephone while searching for an available channel.

In an effort to minimize interference with other cordless telephones, one arrangement described in U.S. Pat. No. 4,768,219 provides a channel scanning process for selecting an unoccupied channel. In this arrangement, the handset and the base unit while in a standby mode scan the allocated channels for detecting the ones with interference. When communications is desired by a user, the telephone is placed in an active mode where the base and handset both scan the channels that were not found to have interference. Although this arrangement eventually selects an available channel, it has the disadvantage of being slow to respond to a user attempting to use the telephone as the base and handset attempt to locate each other on a mutually acceptable channel. This arrangement may also cause interference to other users as the base or handset transmits on what are believed to be free channels while trying to locate each other on the mutually acceptable channel.

SUMMARY OF THE INVENTION

In accordance with the invention, an arrangement for reliably selecting an available communication channel with a minimum probability of interference and without delay is provided for a cordless telephone. This arrangement avoids causing and receiving interference on a channel by scanning all available channels when the cordless telephone is not in use and prioritizing these channels in the order of most recent observed activity. When a user of the handset unit of the cordless telephone desires to communicate with the base unit of that telephone, to, for example, place a telephone call, the handset and base unit communicate briefly on the channel on which they last communicated. When communication between the handset unit and the base unit has been established, the base unit requests that the handset unit move along with it to the channel that has been unused by any other cordless telephone for the longest period of time.

In accordance with the invention, the cordless telephone has a base unit with a first transmitter and a first receiver and a handset unit with a second transmitter and a second receiver for respectively transmitting to the first receiver and receiving from the first transmitter in the base unit over any one of a plurality of communication channels. The cordless telephone also includes channel scanning means in the base unit for scanning the plurality of communication channels, the scanning means being operable for detecting the presence of interference on each one of the plurality of communication channels while the handset unit and the base unit are in a standby state wherein no user initiated communications exists between these units.

Also included in the base unit are means for assigning an ordered position to each of the plurality of channels in accordance with the interference detected on each channel while the base unit is in the standby state, the ordered position of each channel being indicative of the period during which the interference last occurred on each one of the plurality of channels. The cordless telephone further includes control means for establishing communications between the handset unit and the base unit, the control means changing the base unit and handset unit from a standby state to an active state whenever user initiated communications exists between these units, and the communications being established in the active state over the one of the plurality of channels having the longest period after which any interference last occurred thereon.

BRIEF DESCRIPTION OF THE DRAWING

This invention and its mode of operation will be more clearly understood from the following detailed description when read with the appended drawing in which.

Throughout the drawing, the same elements when shown in more that one figure are designated by the same reference numerals.

DETAILED DESCRIPTION

Figure 1:
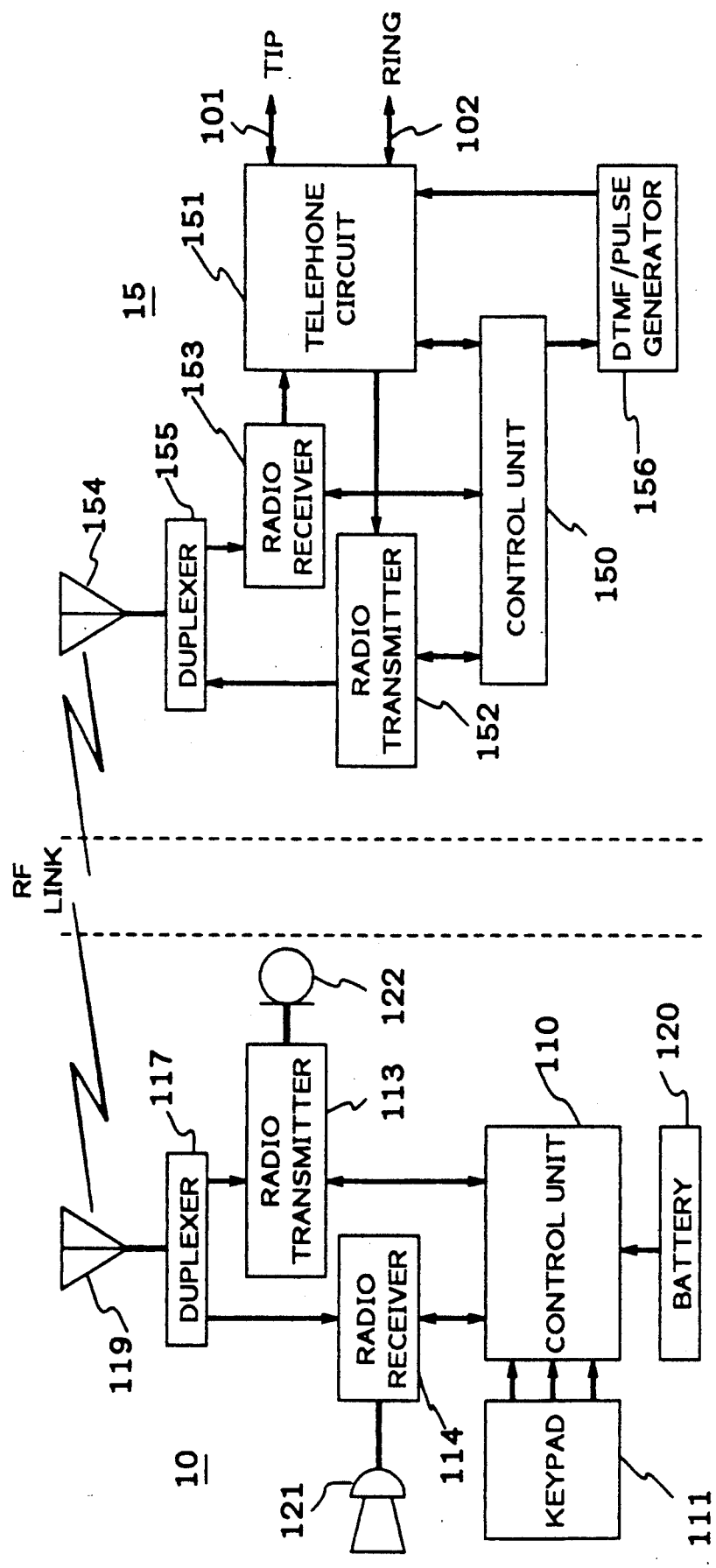
FIG. 1 is a functional block representation of a cordless telephone suitable for incorporating the frequency selecting arrangement in accordance with the principles of the invention.

FIG. 1 is a functional block representation of a cordless telephone incorporating a channel selecting arrangement operative in accordance with the principles of the invention. As shown, the cordless telephone generally comprises a handset unit 10 and a base unit 15 which are both operable on a plurality of communication channels. Included in the handset unit 10 is a control unit 110 which advantageously provides a number of control functions. This control unit 110 may be implemented through the use of a microcomputer containing read-only-memory (ROM), random-access-memory (RAM) and through use of the proper coding. Such a microcomputer is known in the art and is readily available from semiconductor manufacturers such as Signetics, Intel and AMD.

The control unit 110 stores security code data that is generated by the base unit 15 and provided to the handset unit 10 in accordance with the teachings of U.S. Pat. No. 4,736,404 issued to R. E. Anglikowski, et al. on Apr. 5, 1988. The security code data stored in control unit 110 is transmitted from the handset unit 10 to the base unit 15 while establishing initial communications as well as during the transfer of subsequent opcode data to the base unit. This control unit 110 also configures a radio frequency (RF) transmitter 113 and a RF receiver 114 for operation on each of the plurality of channels. The transmitter 113 and the receiver 114 respectively transmit signals to and receive signals from the base unit 15 with the control unit 110 providing the appropriate channel control information to both units.

The transmit and receive signals of the handset unit 10 are coupled to a duplexer 117 which permits the transmitter 113 and the receiver 114 to both simultaneously operate over antenna 119 while preventing the output of transmitter 113 from being coupled directly to the input of the receiver 114. The receiver 114 also demodulates voice signals transmitted by the base unit 15 and couples these signals to a loudspeaker 121. The transmitter 113 has as its input speech signals from a microphone 122 which it transmits to the base unit 15. A battery 120 and a keypad 111 are also included in the handset unit 10. The battery 120 provides operating power for all circuitry in this unit and the key pad 111 is used for entering dial digits and control functions executable by the control unit 110 or transmitted to the base unit 15.

In operation, the control unit 110 processes the appropriate channel selection and security code data selected for use in the handset unit 10 and generates a request-for-service signal which is transmitted by transmitter 113 over the last used channel while the handset unit and base unit are tuned to this channel. If this is the first use of the handset unit since initialization or start-up, a predetermined one of the multiple channels is used for this initial communication. The request-for-service signal comprises a frequency shift keying (FSK) signal and includes a synchronizing signal immediately followed by a data field which contains the security code generated by the control unit 110.

Referring next to the base unit 15, there is shown a control unit 150 which interfaces with the control unit 110 in the handset 10 and, while the handset 10 is located in a mating cradle in the base unit 15, generates and transfers the security code data to the control unit 110. This control unit 150 also compares the received security code data with its stored security code data during the establishing of a two-way communications link between the handset unit 10 and the base unit 15. A favorable comparison of the data from the two security codes must be achieved in order for the base unit 15 to respond to a request-for-service signal from a handset unit. This control unit 150 also receives and processes opcode data provided by the handset unit 10 in dialing and providing signaling information out to a central office via a telephone circuit 151 and tip-ring lines 101 and 102. Like the control unit 110, this control unit 150 may be implemented through the use of a microcomputer containing ROM, RAM and through use of the proper coding. Such a microcomputer is known in the art and is readily available from semiconductor manufacturers such as Signetics, Intel and AMD.

Communications with the handset unit 10 are provided via transmitter 152 and receiver 153 in the base unit. The output of the transmitter 152 and input for the receiver 153 are commonly coupled to an antenna 214 through a duplexer 215. The telephone circuit 151 serves as a "plain old telephone service" (POTS) interface for signals on the tip-ring lines and for those signals received by the receiver 153 or transmitted by the transmitter 152. Responsive to the control unit 150, a generator 156 configurable to either generate dual-tone-multiple-frequency (DTMF) signals or pulse signals provides the selected signal to the telephone circuit 151 for dialing over the tip-ring lines 101 and 202 which connect to the central office or other appropriate switch.

The control unit 150 determines the operating channel information in a manner that minimizes the probability of interference on a channel in accordance with the invention. This control unit generates and stores information on observed channel usage on all allocated channels while the cordless telephone is in the standby state wherein no communication exists between the base unit and the handset unit. When a user of the associated handset unit generates a request-for-service signal, the control unit 150 in the base unit 15 responds and causes transmitter 152 to transmit a channel change request via FSK signals to the control unit 110 in the handset unit, as appropriate. The channel contained in the channel change request is determined by a process described in detail later herein.

Figure 2:
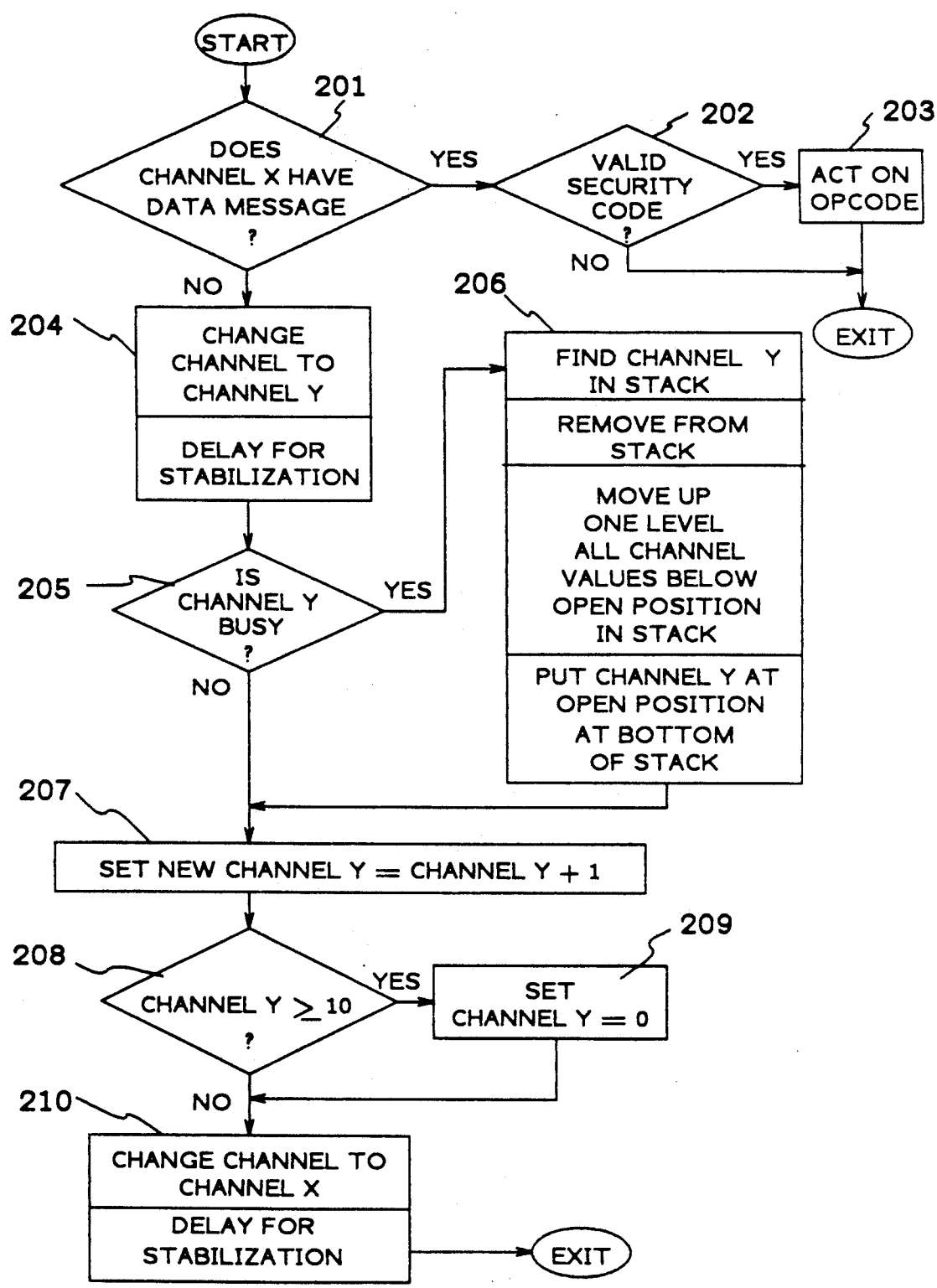
FIG. 2 is a flow diagram of a process suitable for incorporation into the base unit of the portable telephone shown in FIG. 1 in accordance with the invention.

FIG. 2 is a flow chart illustrating the operation of the base unit 15 in performing the channel scan operation. The functions performed by control unit 150 are advantageously determined by a process or program contained in the ROM located in this control unit. This process provides for the selection of an available channel for the user of the cordless telephone. The process is entered at decision 201 periodically for monitoring the channel last used in communications between the base unit and the handset unit to detect any request-for-service signal that is then being generated on this channel by the handset unit and also for scanning other of the plurality of channels to detect any activity thereon. Each one of all the channels gets scanned for this activity within each five second period.

With reference to the process illustrated in FIG. 2 and the circuitry of the base unit 15 illustrated in FIG. 1, if a signal on the last used channel, designated and referred to hereinafter as channel "X" is received by receiver 153, the control unit 150 in the base unit 15 observes the data in this signal at decision 201 to determine if a recognizable pattern such as a preamble or header in a data message exists. A format suitable for transmission of the data messages between the base unit 15 and the handset unit 10 is described in U.S. Pat. No. 4,731,814 issued to W. R. Becker et al. on Mar. 15, 1988. If such a preamble pattern exists on channel X, it indicates that a data field containing either command opcode data or dial digit data most likely follows. The data field also includes data representative of the security code then contained in the handset unit 10.

If a preamble pattern is detected at decision 201, the process advances to decision 202. At decision 202, the process determines if the data for the security code in the data field is the same as that stored in memory in the control unit 150. If so, then the process concludes that the data message is intended for the base unit 15 and then advances to step 203. At this step, the base unit 15 responds to the data contained in the opcode by first, in combination with the handset unit 10, executing the protocol shown in FIG. 3, and then executing the step or steps required by this opcode. After this step 203, the process is then exited. If the security code in the data message is not valid, i.e., not recognized by the control unit 150, then no action is taken and the process is exited after decision 202.

Referring once again to decision 201, if channel X does not contain a preamble message, the process advances to step 204 where the control unit 150 causes the receiver 153 to shift its monitored channel from channel X to a new channel designated as channel "Y" and referred to as such hereinafter. When this channel Y is also the last used channel for communications between the base unit and the handset unit, then channel Y is equal to channel X and no channel change of receiver 153 is necessary. When the channel X and channel Y are different, a small delay is provided in this step 204 to allow a synthesizer and signal detector (both not shown) to stabilize in the receiver 153. Once this delay has been completed the process advances to decision 205 where channel Y is monitored to determine if it is busy or idle. If channel Y is found not to be busy, i.e., no carrier signal is detected on this channel, the process advances to step 207. If a carrier signal is detected, however, the channel is considered to be busy and the process advances to step 206.

Step 206 contains several operations all of which function in concert to prioritize the plurality of communication channels, by way of example, in a vertical stacking order such that in the resulting vertical structure the topmost position contains the channel that has been idle for the longest period of time and the bottommost position contains the channel that has been idle for the shortest period of time. The channels interposed in positions between this topmost position and the bottommost position are similarly arranged according to their recency of use with each channel that has been idle longer than another being located in a position above said other channel. When the cordless telephone is initialized or first activated, two or more channels may not be found busy by the process for some time after the initialization of the cordless telephone, these channels are interchangeable located in the topmost position and next adjacent positions until a carrier signal is respectively detected thereon, after which each one of these channels is prioritized as indicated herein.

The prioritization process within step 206 operates in the following manner. The position which contains channel Y that is found to be busy is located within the stack. This channel Y is removed from the stack leaving a vacancy at this position. Next, all channels that are in positions below this newly created vacancy are moved up one position creating a vacancy at the bottommost position. Finally, the channel Y that was found busy and removed from the stack is reinserted into the stack in the recently vacated position at the bottom of the stack. Once the processing of step 206 is complete, the process advances to step 207.

At step 207, a counter (in control unit 150) which determines the channel on which the receiver 153 of the base unit 15 operates is incremented thereby selecting the next channel to be monitored. The process next advances to decision 208 where a determination is made as to whether the count indicative of the channel selected for monitoring is equal to or greater than the highest number of available channels, which is shown as ten for illustration purposes. If the count indicative of the channel selected for monitoring is found to be equal to or greater than the highest number of available channels, the process advances to step 209 where a defined first monitored one of the channels in accordance with the process is selected for monitoring. On the other hand, if the count indicative of the channel selected for monitoring is found not to be equal to or greater than the highest number of available channels, then the process advances from decision 208 to step 210 where the monitored channel is changed to channel X and a small delay is provided to allow the synthesizer and signal detector to stabilize in the receiver 153 at this new frequency. Once this delay has been completed the process is exited.

Figure 3:
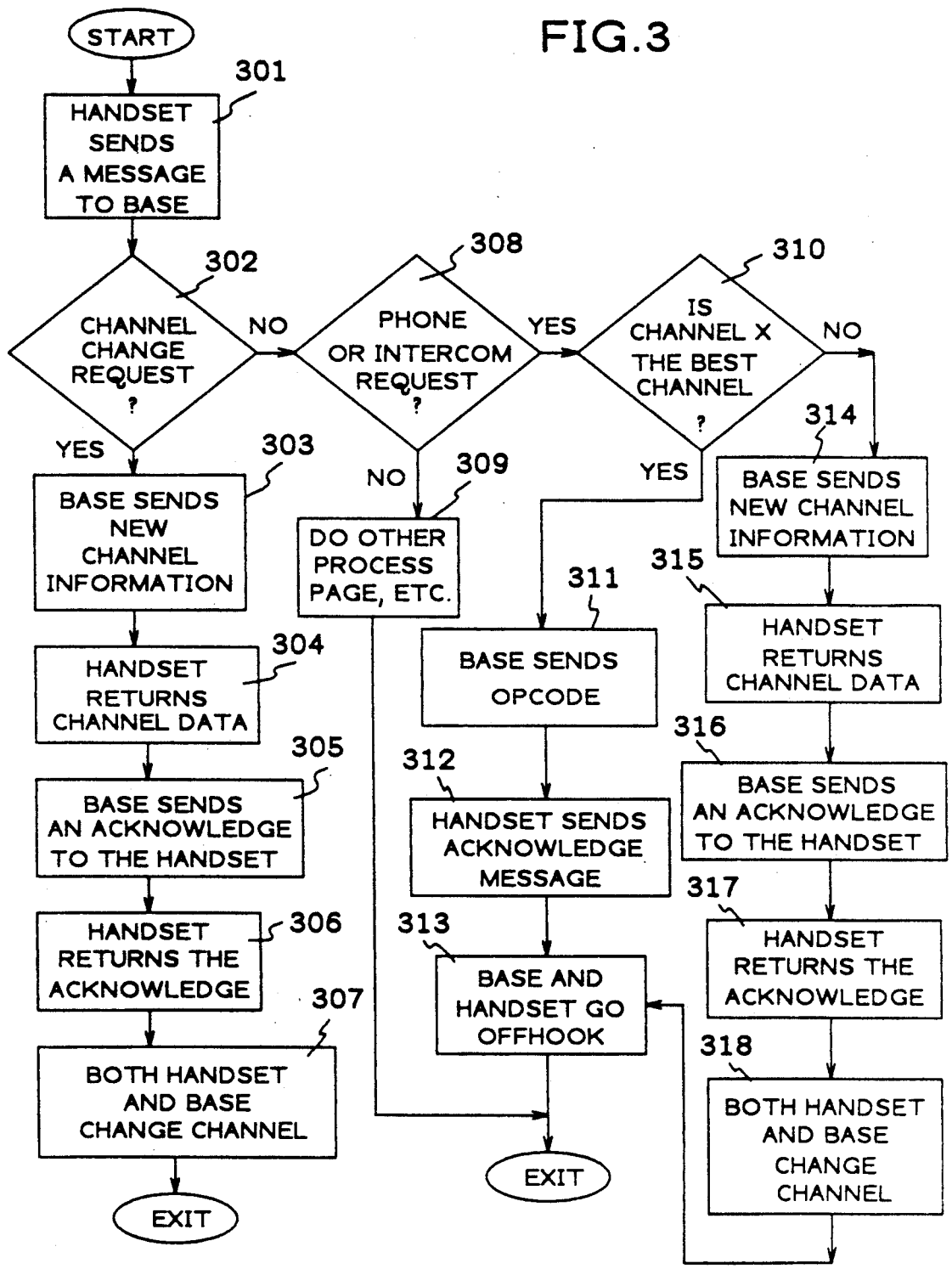
FIG. 3 shows the protocol of the cordless telephone depicting the specific interaction between a handset unit and an associated base unit in response to a request-for-service signal generated by a user at the handset unit.

Referring next to FIG. 3 there is shown the protocol of the cordless telephone depicting the specific interaction between the handset unit 10 and the base unit 15 in response to a request-for-service signal generated by a user at the handset unit 10. The protocol begins at step 301 where the handset unit 10 sends a message on channel X to the base unit 15 reflective of the request for service signal generated by the user. In decision 302, the base unit determines whether the received message is a channel change request. If so, the base unit sends new channel information in step 303 over channel X and the handset unit returns the channel data in step 304, also over channel X, indicating that it has received the new channel information from the base unit. The base unit next sends an acknowledge signal in step 305 back to the handset unit indicating that the handset unit has received the correct channel data from the base unit. The handset unit then returns the acknowledge signal in step 306 and, in step 307, both handset unit and base unit change to the new channel. From this step, the protocol is exited.

If the request-for-service signal at decision 302 is not a channel change request, the base unit will determine at decision 308 whether the message is a phone or intercom request. A phone request is one wherein the user of the handset unit desires to place a telephone call and requests dial tone from the central office. An intercom request is one where the user of the handset unit desires to communicate with a person that is then near the base unit. If the request-for-service signal at decision 308 is found not to be a phone or intercom request, at step 309, the base unit performs the specifically requested process, such as, for example, the activation of an audible or visible page alarm. No channel change is executed. From step 309, the protocol is exited.

If the request-for-service signal at decision 308 is found to be a phone or intercom request, then the base unit determines in decision 310 whether channel X, the last used channel for communications between the handset and base units, is still the best channel to use for the present communications between these units. It will, in fact, be so in accordance with the invention if channel X is the channel at the top of the stack that is maintained pursuant to step 206 in FIG. 2. Although a request-for-service signal is generally considered a phone request, an intercom request operates in a similar manner and is not specifically distinguished herein. If channel X remains as the best channel, the base unit in step 311 sends an opcode data signal to the handset unit indicating that channel X is the channel to be used by the handset unit in communicating with the base unit. In turn, the handset unit in step 312 sends a message back to the base unit acknowledging that it has received the opcode data signal indicating that channel X is the best channel and will be used for communicating with the base unit. At step 313, both the handset unit and the base unit go off-hook and the user at the handset unit is then able to enter dial digit data or opcode data as appropriate. From this step, the protocol is exited.

If at decision 310, the base unit decides that channel X is not the best channel, as previously determined by the process depicted in FIG. 2 while the base unit and handset unit are in a standby state, the base unit sends the new best channel information in step 314 to the handset unit over channel X. The handset unit returns the channel data in step 315, also over channel X, indicating that it has received the new channel information from the base unit. The base unit next sends an acknowledge signal in step 316 back to the handset unit indicating that the handset unit has received the correct channel data from the base unit. The handset unit then returns the acknowledge signal in step 317 and, in step 318, both handset unit and base unit change to the new best channel. Next, at step 313, both the handset unit and the base unit go off hook and the user at the handset unit is then able to enter dial digit data or opcode data as appropriate. From this step, the protocol is exited.

Figure 4:
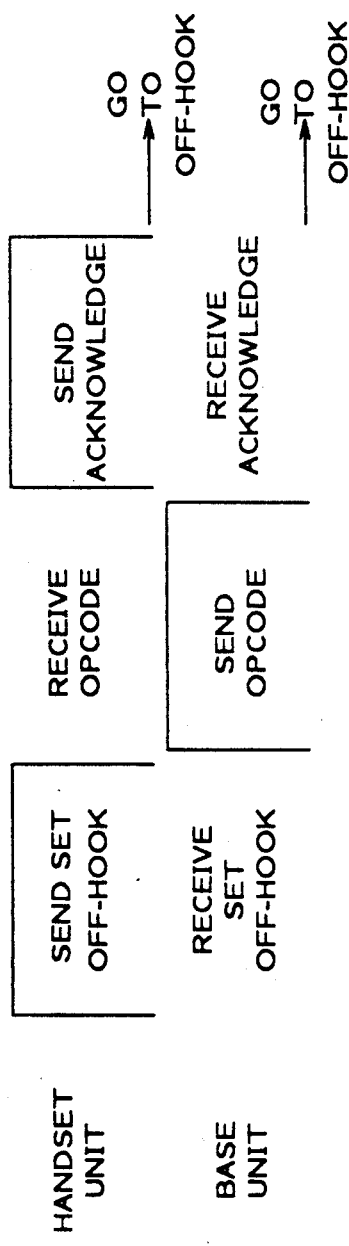
FIG. 4 shows in detail certain aspects of the protocol depicted in FIG. 3 for operation of the handset unit and the base unit of the cordless telephone according to the process described in FIG. 2 and in accordance with the invention.
Figure 4:
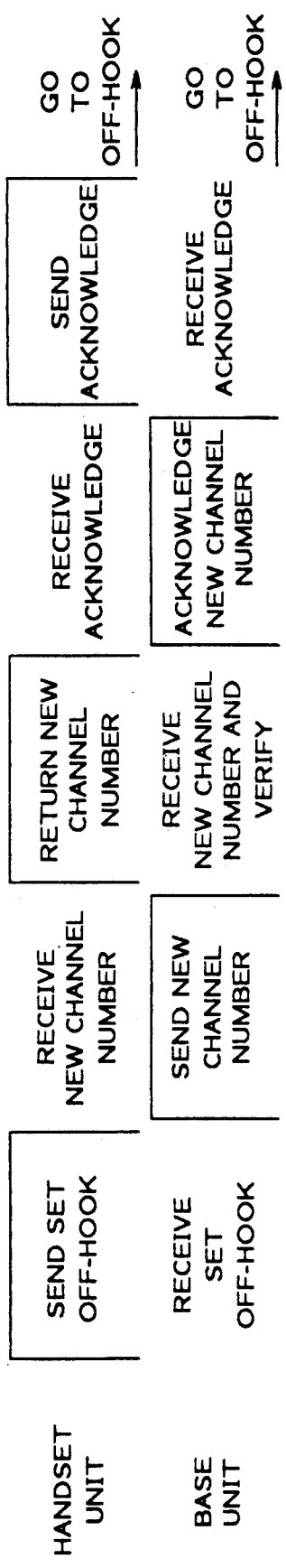

With reference to FIG. 4, there is shown in further detail certain aspects of the protocol depicted in FIG. 3 for operation of the handset unit and the base unit in a first case and in a second case. In the first case, channel X is determined to be the best channel in accordance with the process described in FIG. 2 and in the second case, channel X is determined not to be the best channel in accordance with this process. The data exchanges between the handset and base units are provided to insure that the correct common channel between these two units is selected before they enter an off-hook state.

In the first case where channel X is the best channel, when the handset unit sends and the base unit receives a set off-hook signal, the base unit, in turn, sends a no-channel-change opcode back to the handset unit. The handset unit then sends a message to the base unit acknowledging receipt of the opcode message and both the base unit and the handset unit go off-hook.

In the second case where channel X is not the best channel, when the handset sends and the base unit receives a set off-hook signal, the base unit, in turn, sends a channel-change opcode reflective of a new channel number back to the handset unit. The handset unit then sends this new channel number to the base unit where it is received and verified by the base unit. The base unit then sends a message to the handset unit acknowledging that the channel number then stored in the handset unit is correct. Upon receipt of this acknowledge signal, the handset unit then sends its final acknowledge message to the base unit. Once this message is received, both the base unit and the handset unit go off-hook.

Various modifications of this cordless telephone are possible in accordance with the invention. An example of such a modification is in the operation of the process generally described in FIG. 2 wherein channel X, the last used channel for communication between the handset unit and the base unit, is found to be busy because of possibly another cordless telephone user operating on this channel. In the operation of the process, as modified, the base unit will, in this instance, immediately initiate the channel change procedure and request that the handset unit move along with it to channel Y, the best channel. This process is again repeated if channel Y also becomes busy. In this manner, the user of the telephone is assured of already being on the best channel when he or she initiates a request-for-service signal. If ever the channel change procedure is unsuccessful, then both the base unit and the handset unit will remain on the last channel over which they successfully communicated until the user of the cordless telephone initiates a request-for-service signal.

Another modification of the invention also involves a modification of the process generally described in FIG. 2. The channel scan operation is modified such that certain channels, once identified by a user of the telephone, are removed from consideration by the prioritization process specifically described in step 206. This modification to the process provides an optional training step which resolves the potential problem of the signal detector in receiver 153 not detecting during the channel scan operation certain interference that occurs only after the channel is in use by the user of the cordless telephone. An illustration of this potential problem by way of example is that if the base unit of the cordless telephone is placed adjacent to a telephone answering machine, there is a potential for any low-level radiation from the telephone answering machine to mix with the signals of the transmitter in the base unit and create an interference signal on the base unit's receive frequency. When the transmitter in the base unit is not active, this interference is not created (because it is caused by a mixing action). Hence, the signal detector will not "hear" the interference during its normal channel scan operation.

In order to avoid this potential problem, when the channel scan operation automatically selects an available channel that is then found unsatisfactory to the user (due to interference or any other reason), the user may manually select a new channel by executing a channel change request, typically by pressing a channel change button usually located on the keypad 111 of the handset unit 10. The modified process in the channel scan operation will remember a selectable and predetermined number of these channels, typically two, that the user has moved away from by manual means during a phone or intercom connection. From that point on, whenever the cordless telephone establishes a phone or intercom connection, it will not select either of the user-identified channels marked as unsatisfactory as its choice for the newly established connection. These user identified channels are stored in a register that may be cleared, for example, by pressing the channel change button when the cordless telephone is in the standby or on-hook state.

Various other modifications of this invention are contemplated and may obviously be resorted to by those skilled in the art without departing from the spirit and scope of the invention as hereinafter defined by the appended claims.

We claim:

1. A cordless telephone comprising:
 a base unit with a first transmitter and a first receiver;
 a handset unit with a second transmitter and a second receiver for respectively transmitting to the first receiver and receiving from the first transmitter in the base unit over any one of a plurality of communication channels;
 channel scanning means in the base unit for scanning the plurality of communication channels, the scanning means being operable for detecting the presence of interference on each one of the plurality of communication channels while the the handset unit and the base unit are in a standby state wherein no user initiated communications exists between these units;
 means in the base unit for assigning an ordered position to each of the plurality of channels in accordance with the interference detected on each channel while the base unit is in the standby state, the ordered position of each channel being indicative of the period during which the interference last occurred on each one of the plurality of channels; and
 control means for establishing communications between the handset unit and the base unit, said control means changing the base unit and handset unit from a standby state to an active state whenever user initiated communications exists between these units, the communications being established in the active state over the one of the plurality of channels having the longest period after which any interference last occurred thereon.

2. The cordless telephone of claim 1 wherein the control means further comprises means for processing a user-initiated channel change request while the base unit is in the active state, in response to receipt of said channel change request, the processing means removing from the assigned ordered position the one of the plurality of channels over which communication is then established, the processing means further terminating communication over this channel and re-establishing communication over the one of the plurality of channels having the second longest period after which any interference last occurred thereon while the base unit was in the standby state.

3. The cordless telephone of claim 2 wherein the control means prohibits the further assigning of an ordered position to the one or more of the plurality of channels over which communication was established during the receipt of a user-initiated channel change request.

4. The cordless telephone of claim 1 wherein in response to user initiated communications at the handset unit, the first transmitter provides operating channel information to the second receiver over a channel used during a last established communication between the base unit and the handset unit, and upon receipt of the operating channel information, the second receiver changes from the channel used during the last established communications between the base unit and the handset unit to the one of the channels having the longest period after which any interference last occurred thereon.

5. The cordless telephone of claim 4 wherein in response to the user initiated communications at the handset unit, the first transmitter provides operating channel information to the second receiver over a predetermined channel in the absence of prior established communications between the base unit and the handset unit subsequent to initialization of the base and handset units.

6. The cordless telephone of claim 4 wherein the control means comprises a first control unit in the base unit and a second control unit in the handset unit, and wherein upon the receipt of a user initiated channel change request while the base unit and handset unit are in the active state, the first control unit provides operating channel information to the second control unit and upon receipt of the operating channel information, the second control unit changes the channel of the second receiver to the one of the channels having the second longest period after which any interference last occurred thereon.

7. The cordless telephone of claim 6 wherein in response to each subsequent user initiated channel change request while the base unit and handset unit are in the active state, the first control unit provides operating channel information to the second control unit for changing the channel of the second receiver, the channel selected by the first control unit being the next available unselected channel having the ordered position reflective of the longest period after which any interference last occurred thereon.

8. The cordless telephone of claim 7 wherein the first control unit configures the first transmitter and the first receiver for operation over the selected channel and the second control unit configures the second transmitter and the second receiver for operation over the selected channel.

9. A cordless telephone comprising:
 a first transmitter and a first receiver within a base unit of said telephone;
 a second transmitter and a second receiver within a handset unit of said telephone; for respectively transmitting to the first receiver and receiving from the first transmitter in the base unit over any one of a plurality of communication channels;
 means for detecting the presence of interference on each one of the plurality of communication channels when there are no user-initiated communications between the handset unit and the base unit; and
 control means for establishing user-initiated communications between the handset unit and the base unit over a selected one of said channels, said one of said channels being selected as a function of the respective periods of time since interference was last detected on each one of said plurality of communication channels.

10. A method of selecting a communication channel for a cordless telephone having a base unit with a first transmitter and a first receiver, and a handset unit with a second transmitter and a second receiver for respectively transmitting to the first receiver and receiving from the first transmitter in the base unit over any one of a plurality of communication channels, the method comprising the steps of:

scanning the plurality of communication channels for detecting the presence of interference on each one while the the handset unit and the base unit are in a standby state wherein no user initiated communications exists between these units;

assigning an ordered position to each of the plurality of channels in accordance with the interference detected on each channel while both the handset unit and the base unit are in the standby state, the ordered position of each channel being indicative of the period during which the interference last occurred on each one of the plurality of channels; and establishing communications between the handset unit and the base unit over the one of the plurality of channels having the longest period after which any interference last occurred thereon, the base unit and handset unit changing from a standby state to an active state and establishing communications over the selected one of the plurality of channels whenever user initiated communications exists between these units.

11. The method pursuant to claim 10 wherein in response to user initiated communications at the handset unit, the first transmitter providing operating channel information to the second receiver over a channel used during a last established communication between the base unit and the handset unit, and upon receipt of the operating channel information, the second receiver changing from the channel used during the last established communications between the base unit and the handset unit to the one of the channels having the longest period after which any interference last occurred thereon.

12. The method pursuant to claim 11 wherein in response to user initiated communications at the handset unit, the first transmitter providing operating channel information to the second receiver over a predetermined channel in the absence of prior established communications between the base unit and the handset unit subsequent to initialization of the base and handset units.

13. The method pursuant to claim 11 wherein the base unit includes a first control unit and the handset unit includes a second control unit, and wherein upon the receipt of a user initiated channel change request while the base unit and handset unit are in the active state, the first control unit providing operating channel information to the second control unit and upon receipt of the operating channel information, the second control unit changing the channel of the second receiver to the one of the channels having the second longest period after which any interference last occurred thereon.

14. The method pursuant to claim 13 wherein in response to each subsequent user initiated channel change request while the base unit and handset unit are in the active state, the first control unit provides operating channel information to the second control unit for changing the channel of the second receiver, the channel selected by the first control unit being the next available unselected channel having the ordered position reflective of the longest period after which any interference last occurred thereon.

15. The method pursuant to claim 14 wherein the first control unit configures the first transmitter and the first receiver for operation over the selected channel and the second control unit configures the second transmitter and the second receiver for operation over the selected channel.

* * * * *